UNITED STATES PATENT OFFICE.

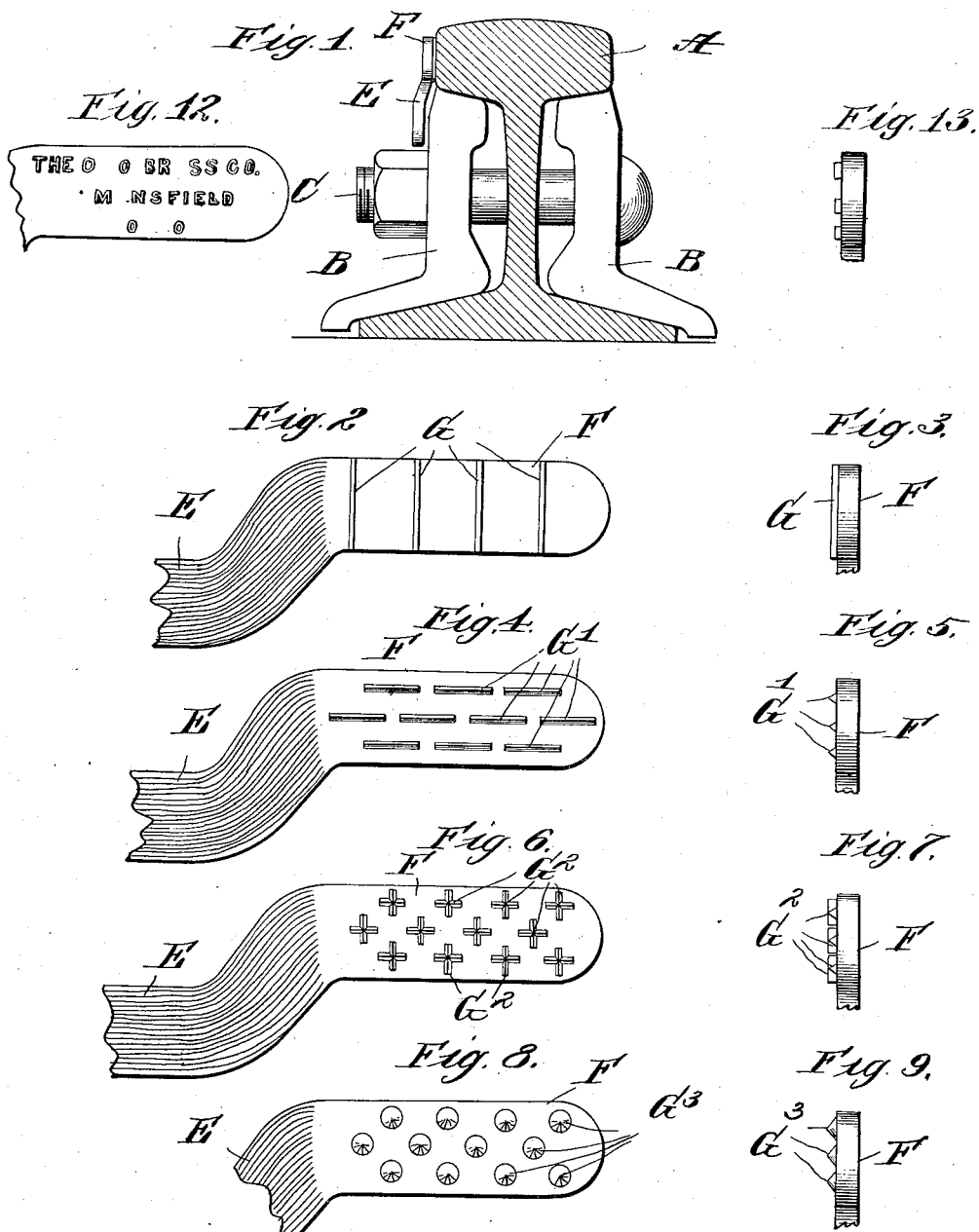

CHARLES R. STURDEVANT, OF MANSFIELD, OHIO, ASSIGNOR TO THE OHIO BRASS COMPANY, OF MANSFIELD, OHIO, A CORPORATION OF NEW JERSEY.

RAIL-BOND.

No. 827,827.        Specification of Letters Patent.        Patented Aug. 7, 1906.

Application filed December 2, 1904. Serial No. 235,157.

*To all whom it may concern:*

Be it known that I, CHARLES R. STURDEVANT, a citizen of the United States, residing at Mansfield, in the county of Richland and State of Ohio, have invented a new and useful Rail-Bond, of which the following is a specification.

This invention relates to rail-bonds.

The object of the invention is to provide a rail-bond having a terminal adapted to be applied to the surface of the rail to be bonded and wherein provision is made of means for offsetting the surface of the bond-terminal from the surface of the rail to which the terminal is to be applied sufficiently to form a space between such surfaces to receive solder, by which the bond-terminal is secured to the rail to be bonded.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in transverse section of a rail, showing the application thereto of a rail-bond embodying in the construction thereof the principles of my invention. Fig. 2 is a view in side elevation of a bond-terminal, a portion of the body of the bond being broken off and showing one form of means for offsetting the bond-terminal surface from the surface of the rail to which such terminal is applied. Fig. 3 is an end view of the construction shown in Fig. 2. Figs. 4, 6, 8, 10, and 12 are views similar to Fig. 2, showing various modified forms of rail-bond terminal embraced within the spirit and scope of my invention. Figs. 5, 7, 9, 11, and 13 are end views, respectively, of the form of bonds shown in Figs. 4, 6, 8, 10, and 12.

The same part is designated by the same reference-sign wherever it occurs throughout the several views.

Referring to Fig. 1, reference-sign A designates the rail to which the bond is to be applied; B, the fish-plates; C, the bolts by which the fish-plates are clamped to the rail. These parts may be of the usual or any well-known construction and arrangement and form no part of my present invention. E designates the rail-bond to be applied to the rail. This bond may be of any suitable construction or formation and provided with a terminal (indicated at F) to be applied to any portion of the surface of the rail to be bonded. Preferably the bond-terminal is provided with a flat surface adapted to be applied flatwise against the surface of the rail to be bonded.

In the application of a rail-bond in the manner above noted to the surface of a rail it is a common practice to secure the same to the rail by solder. In order that the solder may be efficiently applied between the surface of the bond-terminal and the surface of the rail to which the bond is to be applied, it is desirable to provide means whereby the surface of the bond-terminal may be slightly offset from the surface of the rail, so as to provide a space therebetween to receive the solder. In this manner I am enabled to apply solder of appreciable thickness between the surface of the bond-terminal and of the adjacent rail, which thickness or layer of solder of appreciable thickness extends practically over the entire surface of the bond-terminal which is applied to the rail. I have found in practice that in this manner the adhesion of the surfaces of the bond-terminal and rail is much greater than would be the case if only a thin tissue-like layer of solder were employed. Moreover, by slightly offsetting the surface of the bond-terminal from the surface of the rail the solder is permitted to flow freely between all points of the bond-terminal and the adjacent rail-surface, thereby increasing the efficiency of the mechanical connection of the parts and of the electrical contact thereby provided.

It is therefore the purpose of my present invention to provide a construction of bond-terminal wherein provision is made of means for offsetting the surface of the bond-terminal from the surface of the rail, and this result may be accomplished in many specifically different ways within the scope and spirit of my invention. For instance and in the form shown in Figs. 2 and 3, I provide the surface of the bond-terminal which is to be applied to the surface of the rail with ribs or projections G, extending in parallel relation with respect to each other and transversely across the bond-terminal, so that when the bond-terminal is applied to the surface of the rail to be bonded these projections or ribs will bear against the surface of the rail, thereby offsetting the surface of the bond from the adjacent surface of the rail sufficiently to provide a space between such surfaces to receive solder therein, whereby the bond is efficiently applied and soldered to the rail. It is obvious, however, that the same result may be attained in many other specifically different ways. For instance, in Fig. 4 I have shown the bond-terminal provided with a series of ribs or projections G', arranged to extend lengthwise of the bond-terminal instead of transversely across the same, as in Fig. 2. In Fig. 6 I have shown the surface of the bond-terminal provided with a series of star-shaped projections $G^2$ and which will answer the same purpose. In Fig. 8 I have shown the surface of the rail-bond provided with a series of projecting pins $G^3$, which answer the same purpose, and in Fig. 10 I have shown the surface of the rail-bond terminal provided with a series of ribs or projections $G^4$, arranged in crisscross or intersecting relation.

In Figs. 12 and 13 I have shown the surface of the rail-bond which is to be applied to the rail as having letters stamped thereon and which stamped letters may serve not only as an advertisement, but also the purpose of offsetting the surface of the bond-terminal from the rail-surface in the manner above described, being, in effect, projections and formed in the bond-terminal surface. It is obvious that the letters may be of any desired type or character and may or may not form words. In practice the name of the manufacturer of the bond may thus be stamped on the surface of the bond-terminal, thereby serving the double purpose, as above indicated, of offsetting the bond-terminal surface and as an advertisement of the manufacturer. It is manifest, further, that my invention is not to be limited or restricted to the particular form or means for providing the space between the bond-terminal and the rail, for the principle of the invention comprehends any means for providing the space therebetween. It is equally obvious that the particular form or construction of the bond-body is immaterial so far as my invention is concerned and may be varied throughout a wide range and without departure from the spirit and scope of my invention.

I am aware of Patent No. 753,759, issued March 1, 1904, to E. G. Thomas, wherein is disclosed a rail-bond having flat terminals to be attached to the surface of a rail and having a supplementary strip of metal soldered to the upper surface of the bond-terminal and of sufficient length to project beyond the edge of the rail to which the bond is to be attached, and which supplemental piece is provided with a shallow groove to form a channel, into which may be flowed solder. I therefore do not claim such construction.

Having now set forth the object and nature of my invention and a construction embodying the same, what I claim as new and useful and of my own invention, and desire to secure by Letters Patent, is—

1. A rail-bond terminal provided with means for offsetting its surface from that of the rail or other part, to provide a space therebetween.

2. A rail-bond terminal having means formed integrally therewith for offsetting its surface from that of the rail or other part to be bonded, to provide a space therebetween.

3. A rail-bond having a terminal adapted to be applied to a rail or other part to be bonded, the surface of said bond-terminal having projections to offset the same from the surface of the rail or other part to which the bond is to be applied.

4. A rail-bond having a terminal adapted to be applied to the surface of a rail or other part to be bonded, the surface of said terminal to be applied to the rail or other part to be bonded having parallel ribs or projections.

5. A rail-bond having a terminal adapted to be applied to a rail or other part to be bonded, the surface of such terminal to be applied to the rail or other part having projecting ribs extending transversely thereacross.

6. A rail-bond having a terminal adapted to be applied to the surface of the rail or other part to be bonded, for offsetting the surface of the rail-bond terminal from the rail-surface to a uniform extent; whereby is provided a uniform space therebetween.

7. A rail-bond having a terminal adapted to be applied to a rail or other part to be bonded, the surface of such terminal to be applied to the rail or other part having projections of uniform height; whereby a uniform space is provided therebetween.

In witness whereof I have hereunto set my hand, this 29th day of November, 1904, in the presence of the subscribing witnesses.

CHARLES R. STURDEVANT.

Witnesses:
F. M. PIKE,
G. A. MEAD.